US012768632B2

(12) United States Patent
Kojima et al.

(10) Patent No.: US 12,768,632 B2
(45) Date of Patent: Oct. 20, 2026

(54) CALIBRATION MASTER INSTALLING JIG AND MEASURING METHOD FOR CALIBRATION MASTER IN MACHINE TOOL

(71) Applicant: OKUMA CORPORATION, Niwa-Gun (JP)

(72) Inventors: Takuya Kojima, Niwa-Gun (JP); Tetsuya Matsushita, Niwa-Gun (JP); Yasunori Kondo, Niwa-Gun (JP)

(73) Assignee: OKUMA CORPORATION, Niwa-Gun (JP)

( * ) Notice: Subject to any disclaimer, the term of this patent is extended or adjusted under 35 U.S.C. 154(b) by 367 days.

(21) Appl. No.: 18/316,279

(22) Filed: May 12, 2023

(65) Prior Publication Data

US 2023/0384076 A1 Nov. 30, 2023

(30) Foreign Application Priority Data

May 26, 2022 (JP) ................................ 2022-086271

(51) Int. Cl.
*G01B 5/008* (2006.01)

(52) U.S. Cl.
CPC .................................. *G01B 5/008* (2013.01)

(58) Field of Classification Search
CPC .... G01B 21/042; G01B 21/047; G01B 5/008; G01B 5/00; G01B 3/30; B23Q 17/003;
(Continued)

(56) References Cited

U.S. PATENT DOCUMENTS 3,711,929 A * 1/1973 Blakey ................. H01F 7/0252 269/276
5,337,641 A * 8/1994 Duginske ............... B27B 27/02 33/468
(Continued)

FOREIGN PATENT DOCUMENTS

JP S63-081201 U 5/1988
JP 2005-081444 A 3/2005
(Continued)

OTHER PUBLICATIONS

Screen captures from YouTube video clip entitled "Making My CNC Table Alignment Jig", 6 pages, uploaded on May 12, 2019 by user "MarkLindsayCNC". Retrieved from Internet: <https://www.youtube.com/watch?v=6_5F6cZ-vK0>. (Year: 2019).*
(Continued)

*Primary Examiner* — John E Breene
*Assistant Examiner* — Daniel M Quinn
(74) *Attorney, Agent, or Firm* — Muncy, Geissler, Olds & Lowe, P.C.

(57) ABSTRACT

A calibration master installing jig for installing a calibration master in a predetermined direction on a table when the calibration master installed in the predetermined direction on the table is measured using a sensor mounted to a spindle head in a machine tool. The machine tool includes two or more translational axes and the table provided with a plurality of slots or tap holes. The calibration master installing jig includes a plate and a plurality of rod materials. A plurality of holes are provided in the plate. The plurality of rod materials are insertable into the holes. By putting the plurality of rod materials individually inserted into any given plurality of the holes into any of the slots or the tap holes, any given side surface of the plate or a straight line
(Continued)

connecting the plurality of rod materials becomes parallel to the predetermined direction on the table.

1 Claim, 9 Drawing Sheets

(58) Field of Classification Search
CPC ............ B23Q 2717/006; B23Q 33/502; B23Q 33/503; B23Q 17/00; G05B 19/404; G05B 19/4155; G05B 2219/49001; G05B 2219/50297
USPC ...................... 33/502, 503; 700/193; 73/1.81
See application file for complete search history.

(56) References Cited

U.S. PATENT DOCUMENTS 6,178,389 B1 * 1/2001 Sola ...................... G01B 21/04 702/167
6,772,619 B2 * 8/2004 Nashiki ................ B25J 17/0266 73/1.79
7,055,367 B2 * 6/2006 Hajdukiewicz ...... G01B 21/042 702/155
10,357,863 B2 * 7/2019 Matsushita ........ B23Q 17/2485
11,243,062 B2 * 2/2022 Kanbe .................. G01B 21/045
11,892,820 B2 * 2/2024 Kojima ................ G05B 19/404
2007/0271995 A1 * 11/2007 Orchard ............... G01B 21/042 73/1.81
2008/0114485 A1 * 5/2008 Katoh .................. G05B 19/404 700/193
2009/0326849 A1 * 12/2009 MacManus .......... G01B 21/042 33/502
2010/0205815 A1 * 8/2010 Rinn ...................... G01B 11/03 33/502
2013/0192054 A1 * 8/2013 Sato ..................... G01B 21/045 29/592
2014/0109646 A1 * 4/2014 Manlay .................... G01B 5/02 73/1.75
2016/0223325 A1 * 8/2016 Gatton ..................... G01B 3/30
2016/0246282 A1 * 8/2016 Matsushita .......... G05B 19/404
2017/0276651 A1 * 9/2017 Hall ....................... G01N 29/11
2021/0132590 A1 * 5/2021 Kojima ................ G05B 19/404
2021/0318110 A1 * 10/2021 Anderson ................ G01B 5/14
2022/0178679 A1 * 6/2022 Suzuki ................. G05B 19/401

FOREIGN PATENT DOCUMENTS

JP 2009-133791 A 6/2009
JP 6960893 B2 11/2021

OTHER PUBLICATIONS

Screen captures from YouTube video clip entitled "Start using retractable dowel pins and watch your parts immediately improve.", 5 pages, uploaded on Dec. 18, 2019, by user "Elijah_Tooling". Retrieved from Internet: <https://www.youtube.com/watch?v=ddYla9BZKE8>. (Year: 2019).*
<URL: https://www.nabeya.co.jp/search.php?grp=J> retrieved on Apr. 28, 2022 ("Machine vise" manufactured by Nabeya Co., Ltd.).
Japanese Office Action (with English translation) dated Sep. 24, 2025 (Application No. 2022-086271).

* cited by examiner

CALIBRATION MASTER INSTALLING JIG AND MEASURING METHOD FOR CALIBRATION MASTER IN MACHINE TOOL

CROSS REFERENCE TO RELATED APPLICATION

This application claims the benefit of Japanese Patent Application Number 2022-086271 filed on May 26, 2022, the entirety of which is incorporated by reference.

FIELD OF THE INVENTION

The disclosure relates to a calibration master installing jig for installing a calibration master used for measuring motion errors of a machine tool in a predetermined direction on a table and a method for measuring the calibration master in the machine tool.

BACKGROUND OF THE INVENTION

FIG. 1 is a schematic diagram of a machine tool M that includes three translational axes.

A spindle head 2 is allowed to perform a motion of two degrees of translational freedom in an X-axis and a Y-axis, which are the translational axes and are orthogonal to one another. The spindle head 2 is allowed to perform a motion of one degree of translational freedom in a Z-axis, which is orthogonal to the X-axis and the Y-axis. Accordingly, the spindle head 2 has three degrees of translational freedom with respect to a table 3 on a bed 1. Servomotors, which are controlled by a numerical control device, drive respective axes. A workpiece W is fixed to the table 3, a tool is installed to a main spindle of the spindle head 2 and rotated, thus machining the workpiece W in any shape.

A machine tool has motion errors, such as a positioning error, a straightness, and a squareness. The motion errors affect the machining accuracy and measurement accuracy of a workpiece. In order to measure the motion errors of the machine tool, there are some methods including a method for measuring relative positions of target balls (P1 to P5) disposed on a calibration master 12 is used. In the method, the calibration master 12 as an accuracy reference is installed toward a predetermined direction on the table 3 as illustrated in FIG. 2, and a touch probe 11 or a displacement sensor mounted to the spindle head 2 is used. At this time, an installation direction of the calibration master 12 is measured using the touch probe 11, ideal positions of the target balls of the calibration master 12 are calculated based on the result, and the ideal positions and the measured positions of the target balls are compared. Thus, the motion errors of the machine tool can be measured.

JP 6960893 B discloses a method for evaluating errors by using a gage, that is, a calibration master, to which a plurality of balls are fixed to measure distances between the balls of the gauge in measuring motion errors of a machine tool. The gauge includes a base and an arm that is mounted on the base and has a plurality of spherical bodies. The arm can be rotated at any angle to a horizontal direction and/or a perpendicular direction.

On the Internet <URL: https://www.nabeya.co.jp/search.php?grp=J> retrieved on Apr. 28, 2022 (“Machine vise” manufactured by NABEYA Co., Ltd.), machine vises for installing a workpiece in a predetermined direction on a table is disclosed. On the bottom surfaces of the machine vises, guide blocks are disposed. The machine vises can be installed in the predetermined direction by fitting the guide blocks to a slot of the table. Accordingly, it is considered that a calibration master is installed by disposing guide blocks on the bottom surface of the calibration master and using a slot of a table.

The gauge of JP 6960893 B has a complex mechanism, resulting in an increased manufacturing cost. In addition, since the gauge is weighty, it is inconvenient to install it on a table or carry it around.

Meanwhile, when the guide blocks disclosed on the Internet <URL: https://www.nabeya.co.jp/search.php?grp=J> retrieved on Apr. 28, 2022 (“Machine vise” manufactured by NABEYA Co., Ltd.) are used, tap holes and a guide groove are necessary to mount the guide blocks in a predetermined direction on the bottom surface of the calibration master, requiring an additional machining to a ready-made product. However, the additional machining may change the accuracy of the calibration master. Moreover, the guide blocks cannot be used when the table has no slot.

Therefore, it is an object of the disclosure to provide a calibration master installing jig that allows a calibration master used for measuring motion errors of a machine tool to be easily installed in a predetermined direction on a table and a method for measuring the calibration master in the machine tool.

SUMMARY OF THE INVENTION

In order to achieve the above-described object, a first configuration of the disclosure is a calibration master installing jig for installing a calibration master in a predetermined direction on a table when the calibration master installed in the predetermined direction on the table is measured using a sensor mounted to a spindle head in a machine tool. The machine tool includes two or more translational axes, the table provided with a plurality of slots or tap holes, and the spindle head configured to hold a tool. The translational axes enable a relative motion of two degrees or more of translational freedom of the tool held onto the spindle head with respect to a workpiece installed on the table. The calibration master installing jig includes a plate and a plurality of rod materials. A plurality of holes are provided in the plate. The plurality of rod materials are insertable into the holes. By putting the plurality of rod materials individually inserted into any given plurality of the holes into any of the slots or the tap holes, any given side surface of the plate or a straight line connecting the plurality of rod materials becomes parallel to the predetermined direction on the table.

According to another aspect of the disclosure, in the above-described configuration, an angle formed by a first straight line connecting any two of the holes and any of side surfaces of the plate, or an angle formed by the first straight line and a second straight line connecting two of the holes different from any one or both of the two holes is equal to an angle formed by a straight line in a direction in which the slots of the table extend or a straight line connecting two of the tap holes and the predetermined direction.

In order to achieve the above-described object, a second configuration of the disclosure is a measuring method for a calibration master installing jig for installing a calibration master in a predetermined direction on a table to measure the calibration master using a sensor mounted to a spindle head in a machine tool. The machine tool includes two or more translational axes, the table provided with a plurality of slots or tap holes, and the spindle head configured to hold a tool. The translational axes enable a relative motion of two degrees or more of translational freedom of the tool held onto the spindle head with respect to a workpiece installed on the table. The measuring method includes: positioning the calibration master installing jig according to the first configuration on the table such that any given side surface of a plate or a straight line connecting the plurality of rod materials is in the predetermined direction; installing the calibration master in the predetermined direction by bringing the calibration master into direct contact with the side surface of the plate or the plurality of rod materials, or into indirect contact with the side surface of the plate or the plurality of rod materials via another auxiliary jig; and measuring the calibration master using the sensor.

With the disclosure, the calibration master installing jig that allows the calibration master to be easily installed in a predetermined direction in measuring motion errors of a machine tool can be provided in a lightweight and inexpensive manner. Since it is not necessary to mount a component to the calibration master, the calibration master installing jig can be used for a ready-made calibration master. Furthermore, even without a slot on a table, the calibration master can be installed in a predetermined direction using tap holes and measured.

DETAILED DESCRIPTION OF THE INVENTION

The following describes embodiments of the disclosure based on the drawings.

Embodiment 1 of the disclosure will be described.

Figure 1:
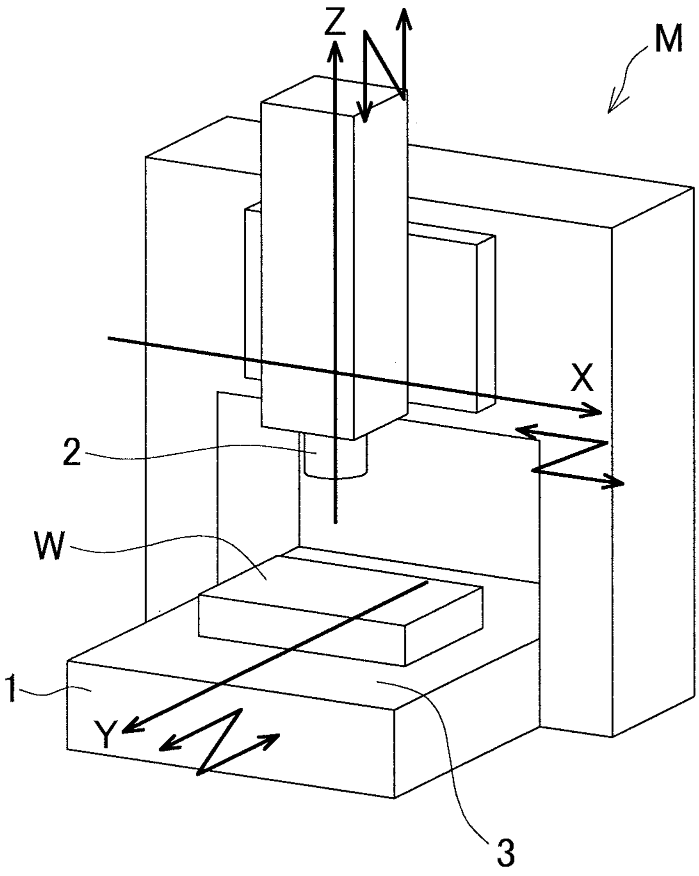
FIG.1 Prior Art
FIG. 1 is a schematic diagram of a machine tool that includes translational axes of an X-axis, a Y-axis, and a Z-axis.
Figure 2:
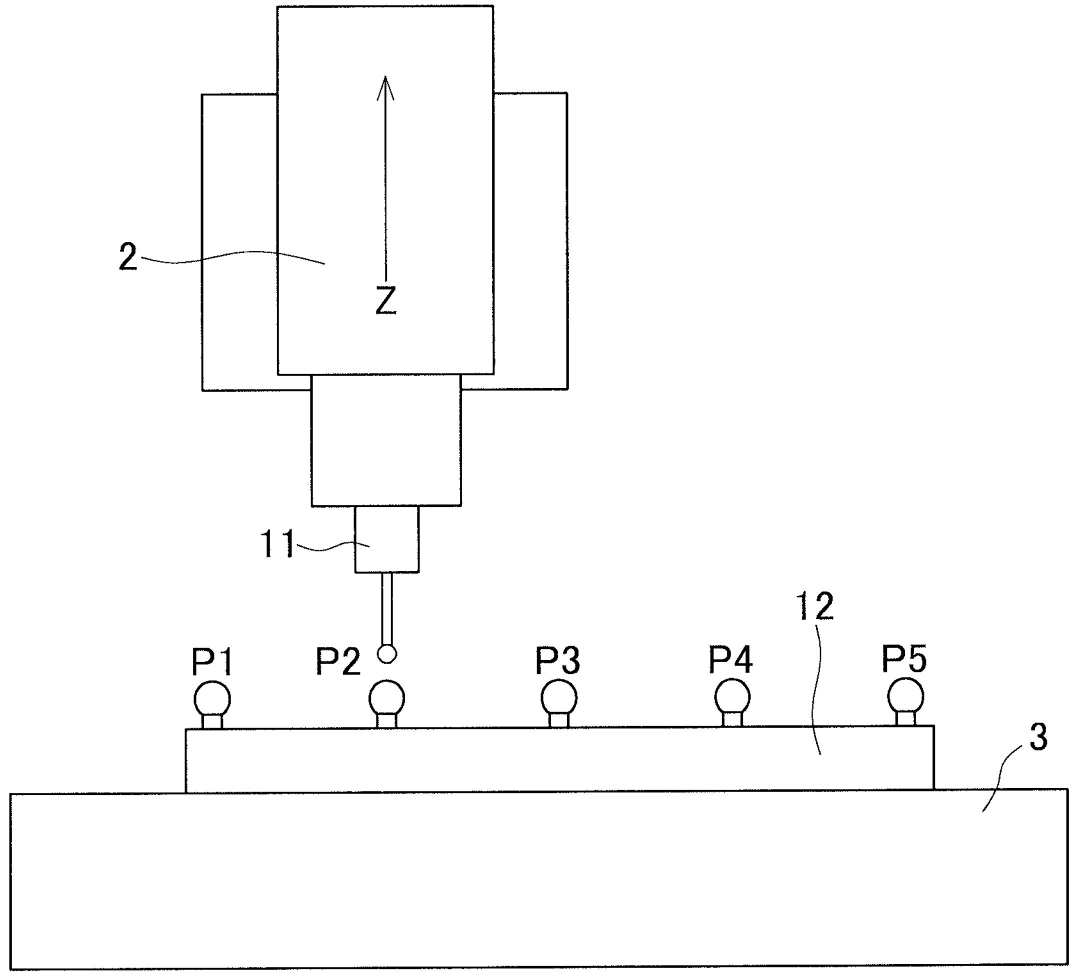
FIG.2 Prior Art
FIG. 2 is a schematic diagram of a touch probe and a calibration master installed on a table.
Figure 3:
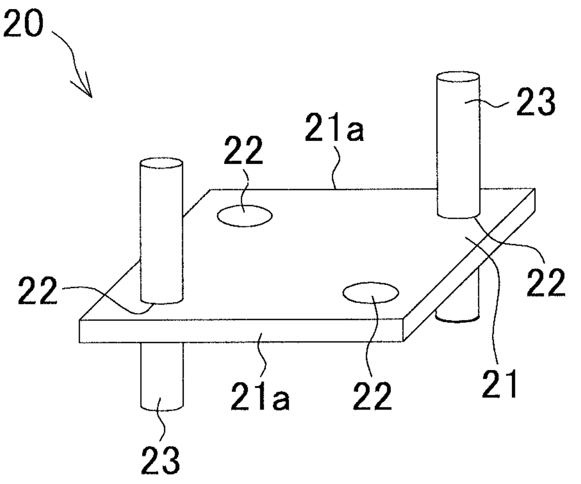
FIG. 3 is an exemplary calibration master installing jig of Embodiment 1.
Figure 4:
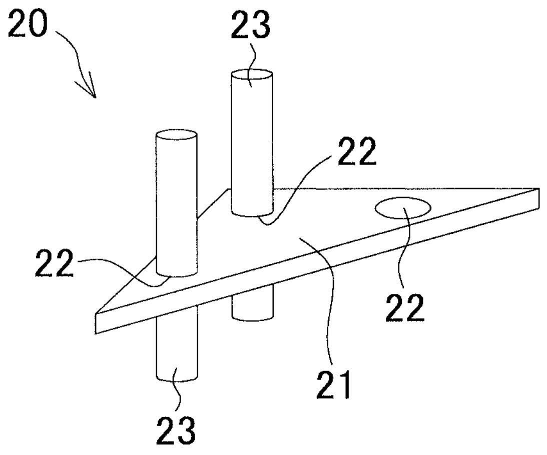
FIG. 4 is another exemplary calibration master installing jig of Embodiment 1.

First, an exemplary calibration master installing jig according to a first configuration will be described. As illustrated in FIG. 3, a calibration master installing jig (hereinafter simply referred to as a "jig") 20 is composed of a plate 21 in a square shape in plan view and two rod materials 23, 23. In the plate 21, four holes 22, 22 . . . are formed to pass through at respective corner portions. In the jig 20, an angle formed by each side surface of the plate 21 and a straight line connecting two holes 22, 22 among the four holes 22 is any of 0°, 45°, or 90°. The rod material 23 can be inserted into the hole 22. The hole 22 is not limited to a through hole and may be a blind hole or a tap hole. It is only necessary to allow inserting a rod material. Furthermore, the plate 21 is not limited to a quadrangle and may be a triangle as illustrated in FIG. 4 or a polygonal shape having five or more corners.

Here, the calibration master 12 is installed in each of an X-axis direction, a Y-axis direction, and a direction of 45° with respect to the X-axis as predetermined directions to perform a measurement. The following describes a method according to a second configuration for installing the calibration master 12 in the predetermined directions using the jig 20 and measuring it using FIG. 5 to FIG. 7.

Figure 5:
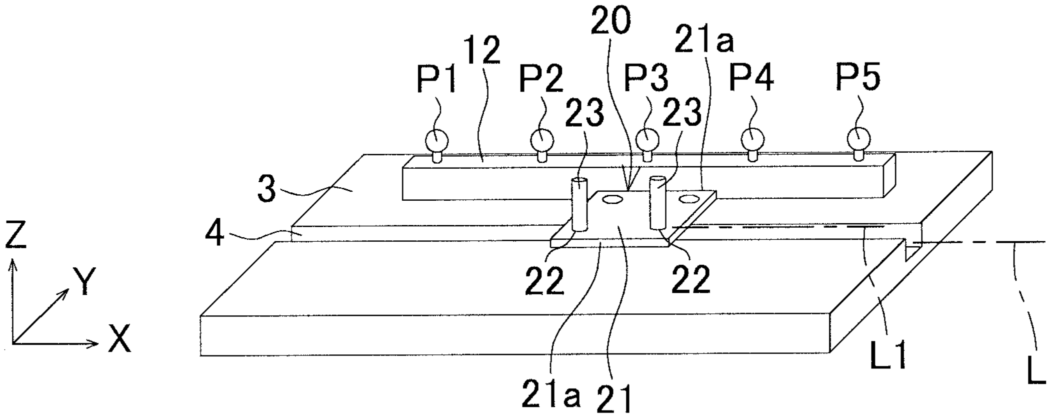
FIG. 5 is a schematic diagram of a calibration master installed in a direction along a slot of the table using the calibration master installing jig of Embodiment 1.

FIG. 5 illustrates a state where the calibration master 12 that includes a plurality of target balls P1, P2 . . . at even intervals on the top surface is installed in the X-axis direction using the jig 20. On the top surface of the table 3 of a machine tool M, a plurality of slots 4, only one of which is illustrated in FIG. 5, are provided in the X-axis direction.

In the example, first, the two rod materials 23, 23 are inserted into two holes 22, 22 provided in the plate 21. In FIG. 5, the holes 22 are through holes. When the holes 22 are blind holes or tap holes, the rod materials 23 are inserted from the lower side of the plate 21. The holes 22, 22 used at this time are two holes 22, 22 aligned in a direction parallel to a pair of parallel side surfaces 21*a*, 21*a* of the plate 21.

Next, the rod materials 23, 23 projecting downward from the plate 21 are put into the slot 4. Then, the plate 21 is positioned such that the side surfaces 21*a* become parallel to the slot 4. Accordingly, by pressing a longitudinal side surface of the calibration master 12 against any one of the side surfaces 21*a* of the installed plate 21, the calibration master 12 can be installed in the X-axis direction.

In the jig 20, an angle (here, 0°) formed by a first straight line L1 connecting the two holes 22, 22 and the side surface 21*a* of the plate 21 is equal to an angle (here, 0°) formed by a straight line L in the slot 4 direction of the table 3 and the X-axis direction as the predetermined direction.

Accordingly, when the rod materials 23, 23 inserted into the holes 22, 22 are put into the slot 4, the side surface 21*a* parallel to the rod materials 23, 23 becomes parallel to the X-axis direction. Therefore, the calibration master 12 pressed against the side surface 21*a* is installed also in the X-axis direction.

Subsequently, a method for measuring positions of two target balls P1, P2 on the installed calibration master 12 with the touch probe 11 will be described. The touch probe 11 is an exemplary sensor of the disclosure.

The calibration master 12 is installed approximately in the X-axis direction, and relative X-axis, Y-axis, Z-axis positions of the target balls P1, P2 are already known. In view of this, the target balls P1, P2 can be automatically measured using the touch probe 11. It is only necessary for the positions of the target balls P1, P2 to fall within a range where they can be measured with the touch probe 11. The position and inclination at which the jig 20 is installed and the dimension and geometric accuracy of the jig 20 need not be highly accurate.

By measuring the positions of the target balls P1, P2 using the touch probe 11, measurement values Xm2, Ym2, Zm2 of the relative positions of the target ball P2 to P1 are obtained. The relative positions in the X-direction, Y-direction, and Z-direction of the target ball P2 to the target ball P1 when the calibration master 12 is installed in the X-axis direction are set to Xc2, Yc2, Zc2. Then, error values δx2, δy2, δz2 are obtained by the following formulas.

$$\delta x2 = Xm2 - Xc2$$

$$\delta y2 = Ym2 - Yc2$$

$$\delta z2 = Zm2 - Zc2$$

Inclination errors ay, az of the installation direction to the Y-direction and the Z-direction are obtained as follows.

$$ay = \delta y2 / Xc2$$

$$az = \delta z2 / Xc2$$

By taking into consideration the inclination errors ay, az of the calibration master 12, relative positions Xci', Yci', Zci' of the target balls Pi (i=3 to 5) to the target ball P1 are calculated as follows.

$$Xci' = Xci$$

$$Yci' = Yci + ay * Xci$$

$$Zci' = Zci + az * Xci$$

Xci, Yci, Zci are relative positions of the target balls Pi (i=3 to 5) to the target ball P1 before being corrected for the inclination errors.

By determining a command value of each axis based on the obtained relative positions Xci', Yci', Zci' that are corrected for the inclination errors, each target ball Pi can be measured. In addition, motion errors can be measured by comparing the command value and the measurement value of each axis.

Figure 6:
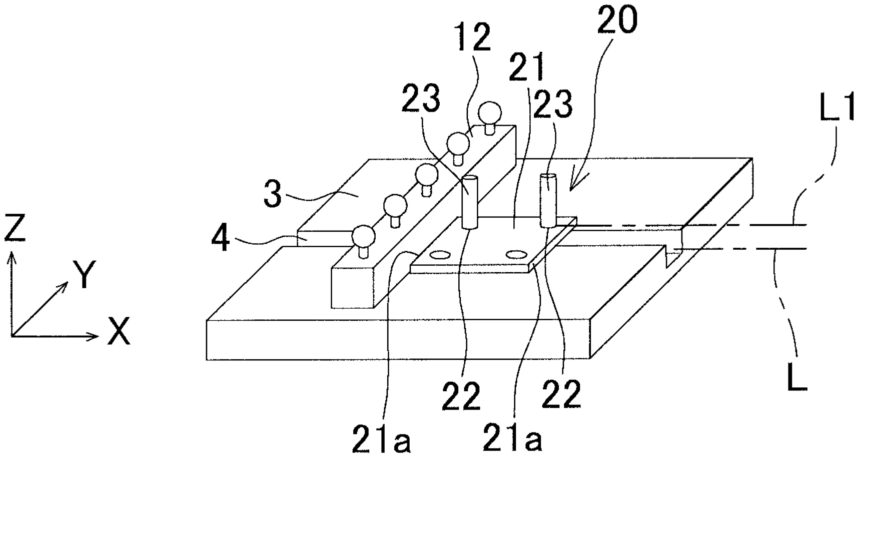
FIG. 6 is a schematic diagram of the calibration master installed in a direction perpendicular to the slot of the table using the calibration master installing jig of Embodiment 1.

FIG. 6 illustrates a state where the calibration master 12 is installed in the Y-axis direction using the jig 20. Similarly to the installation in the X-axis direction, the two rod materials 23, 23 are inserted into two holes 22, 22 provided in the plate 21. The holes 22, 22 used here are aligned in a direction perpendicular to the side surfaces 21*a* of the plate 21.

Next, by putting the inserted rod materials 23, 23 into the slot 4, the plate 21 can be positioned such that the side surfaces 21*a* becomes perpendicular to the slot 4. Accordingly, by pressing the longitudinal side surface of the calibration master 12 against any one of the side surfaces 21*a* of the positioned plate 21, the calibration master 12 can be installed in the Y-axis direction.

In the jig 20, an angle (here, 90°) formed by the first straight line L1 connecting the two holes 22, 22 and the side surfaces 21*a* of the plate 21 is equal to an angle (here, 90°) formed by the straight line L in which the slot 4 of the table 3 extends and the Y-axis direction as the predetermined direction.

Accordingly, when the rod materials 23, 23 inserted into the holes 22, 22 aligned in the first straight line L1 direction are put into the slot 4, the side surfaces 21*a* perpendicular to the rod materials 23, 23 become parallel to the Y-axis direction. Therefore, the calibration master 12 pressed against the side surface 21*a* is installed also in the Y-axis direction.

Similarly to the installation in the X-axis direction, the motion errors can be measured by measuring the installed calibration master 12 after correcting the positions of the target balls only for the inclination errors.

Figure 7:
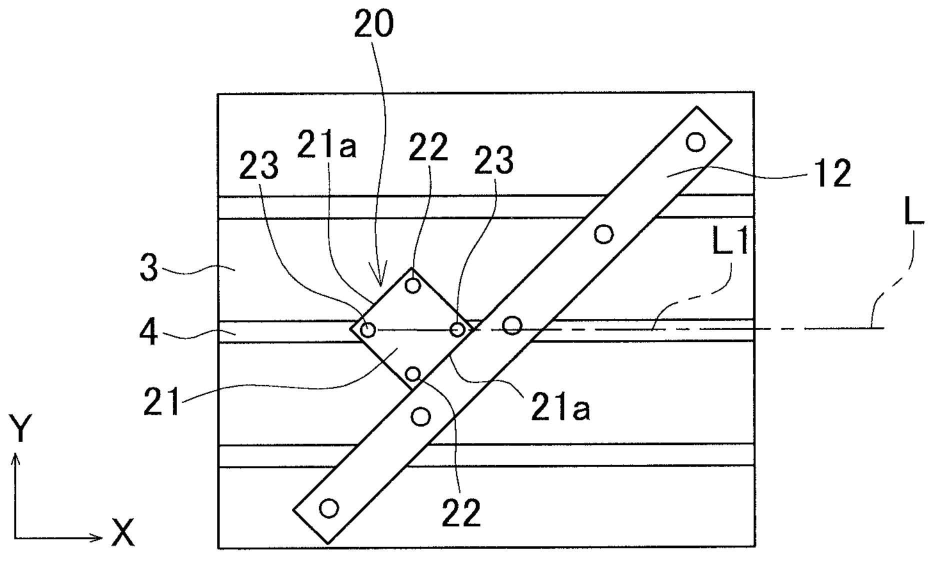
FIG. 7 is a schematic diagram of the calibration master installed in a direction of 45° with respect to the slot of the table using the calibration master installing jig of Embodiment 1.

FIG. 7 illustrates a state where the calibration master 12 is installed in the direction of 45° with respect to the X-axis using the jig 20. First, the two rod materials 23, 23 are inserted into two holes 22, 22 provided in the plate 21. The holes 22, 22 used at this time are aligned in a direction of 45°, that is, a diagonal direction, with respect to the side surfaces 21*a* of the plate 21.

Next, by putting the inserted rod materials 23, 23 into the slot 4, the plate 21 can be positioned such that the side surfaces 21*a* become in a direction of 45° with respect to the slot 4. Accordingly, by pressing the longitudinal side surface of the calibration master 12 against any one of the side surfaces 21*a* of the positioned plate 21, the calibration master 12 can be installed in the direction of 45° with respect to the X-axis.

In the jig 20, an angle (here, 45°) formed by the first straight line L1 connecting the two holes 22, 22 and the side surfaces 21*a* of the plate 21 is equal to an angle (here, 45°) formed by the straight line L in the slot 4 direction of the table 3 and the direction of 45° with respect to the X-axis as the predetermined direction.

Accordingly, when the rod materials 23, 23 inserted into the holes 22, 22 aligned in the first straight line L1 direction are put into the slot 4, the side surfaces 21*a* become parallel to the direction of 45° with respect to the X-axis. Therefore, the calibration master 12 pressed against the side surface 21*a* is installed also in the direction of 45° with respect to the X-axis Similarly to the installation in the X-axis direction, the motion errors can be measured by measuring the installed calibration master 12 after correcting the positions of the target balls only for the inclination errors.

The jig 20 of the above Embodiment 1 includes the plate 21 in which a plurality of holes 22 are provided and a plurality of rod materials 23 insertable into the holes 22. By putting the plurality of rod materials 23 individually inserted into any given plurality of holes 22 into any given slot 4, any given side surface 21*a* of the plate 21 becomes parallel to a predetermined direction on the table 3.

In addition, the procedure of the method for measuring the calibration master 12 of the above Embodiment 1 includes positioning the jig 20 on the table 3 such that any given side surface 21*a* of the plate 21 is in a predetermined direction, installing the calibration master 12 in the predetermined direction by bringing the calibration master 12 into direct contact with the side surface 21*a* of the plate 21, and measuring the calibration master 12 using the touch probe 11.

With the configuration, the calibration master 12 used for measuring the motion errors of a machine tool can be easily installed in a predetermined direction on the table 3. Moreover, since it is not necessary to mount a component to the calibration master 12, the jig 20 is configured to be lightweight and inexpensive and can be used for the ready-made calibration master.

Embodiment 2 of the disclosure will be described.

While the calibration master 12 is installed by bringing the calibration master 12 into direct contact with the jig 20 in the above Embodiment 1, the calibration master 12 can be installed indirectly by the jig 20 using another jig. The following describes the embodiment. Identical reference numerals are attached to component parts identical to those of Embodiment 1, and overlapping descriptions are omitted.

Figure 8:
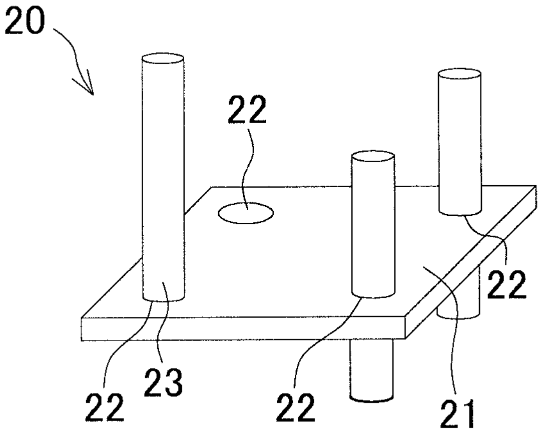
FIG. 8 is another exemplary calibration master installing jig of Embodiment 2.

As illustrated in FIG. 8, the jig 20 is composed of the plate 21 in which the four holes 22, 22 . . . are provided and three rod materials 23, 23 . . . . In the jig 20, an angle formed by a straight line connecting two holes 22, 22 that become references, and a straight line connecting one of the holes 22 as references and another hole 22 or a straight line connecting the other two holes 22, 22 is any of 0°, 45°, or 90°. Each of the rod materials 23 can be inserted into each of the holes 22.

Figure 9:
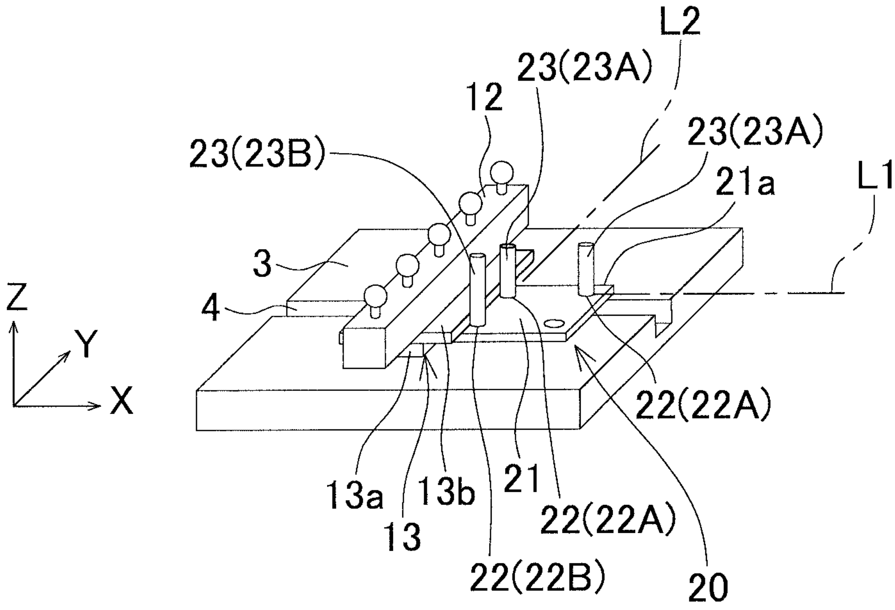
FIG. 9 is a schematic diagram of the calibration master installed in a direction perpendicular to the slot of the table using the calibration master installing jig and an auxiliary jig of Embodiment 2.

FIG. 9 illustrates a state where the calibration master 12 is installed in the Y-axis direction via an auxiliary jig 13 as the other jig. First, two rod materials 23, 23 (denoted as "23A" for distinction) are caused to penetrate two holes 22, 22 (denoted as "22A" for distinction) aligned in parallel to the side surfaces 21*a* of the plate 21. Next, the rod materials 23A, 23A caused to penetrate are put into the slot 4. Finally, by inserting the rod material 23 (denoted as "23B" for distinction) into the hole 22 (denoted as "22B" for distinction) aligned in a direction perpendicular to the slot 4 from the upper side and pressing the auxiliary jig 13 against the two rod materials 23A, 23B aligned in the perpendicular direction, the calibration master 12 fixed in parallel to the auxiliary jig 13 can be installed in the direction perpendicular to the slot 4.

The auxiliary jig 13 has a band plate shape having a lower stepped portion 13*a* and an upper stepped portion 13*b*. The lower stepped portion 13*a* has a larger thickness than the plate 21. The upper stepped portion 13*b* has a larger width than the lower stepped portion 13*a*. The calibration master 12 can be positioned in parallel with the auxiliary jig 13 on the top surface of the upper stepped portion 13*b*. The positioning can be facilitated by forming a slot to which the calibration master 12 fits on the top surface of the upper stepped portion 13*b* in a longitudinal direction.

By bringing a side surface in the longitudinal direction of the upper stepped portion 13*b* on which the calibration master 12 is thus positioned into contact with the rod materials 23A, 23B aligned in the Y-axis direction, the auxiliary jig 13 is fixed in the Y-axis direction. Accordingly, the calibration master 12 on the auxiliary jig 13 is installed also in the Y-axis direction.

In the jig 20, an angle (here, 90°) faulted by the first straight line L1 connecting the two holes 22A, 22A and a second straight line L2 connecting the two holes 22A, 22B, one of which is different from the two holes 22A, 22A, is equal to an angle (here, 90°) formed by the straight line L in the slot 4 direction of the table 3 and the Y-axis direction.

Accordingly, when the rod materials 23A, 23A inserted into the holes 22A, 22A aligned in the first straight line L1 direction are put into the slot 4, the rod materials 23A, 23B aligned in the second straight line L2 direction becomes parallel to the Y-axis direction. Therefore, the auxiliary jig 13 pressed against the rod materials 23A, 23B aligned in the second straight line L2 direction is installed also in the Y-axis direction.

Subsequently, by measuring the positions of the target balls of the installed calibration master 12 with the touch probe 11 by the method similar to that of Embodiment 1, the motion errors can be measured.

The jig 20 of the above Embodiment 2 also includes the plate 21 in which a plurality of holes 22A, 22B are provided and a plurality of rod materials 23A, 23B insertable into the holes 22. By putting the plurality of rod materials 23A, 23A individually inserted into any given plurality of holes 22A, 22A into any given slot 4, the second straight line L2 connecting the rod materials 23A, 23B is parallel to a predetermined direction on the table 3.

In addition, the procedure of the method for measuring the calibration master 12 of the above Embodiment 2 includes positioning the jig 20 on the table 3 such that the second straight line L2 connecting the rod materials 23A, 23B is in a predetermined direction, installing the calibration master 12 in the predetermined direction by bringing the calibration master 12 into indirect contact with the rod materials 23A, 23B via the auxiliary jig 13, and measuring the calibration master 12 using the touch probe 11.

With the configuration, the calibration master 12 used for measuring the motion errors of a machine tool can be easily installed in a predetermined direction on the table 3. Moreover, since it is not necessary to mount a component to the calibration master 12, the jig 20 is configured to be lightweight and inexpensive and can be used for the ready-made calibration master.

The auxiliary jig is not limited to the above embodiment and may be brought into contact with, for example, a side surface of the plate, not with the rod materials. A coupling structure with the jig can be appropriately changed.

The following describes modification examples in common between the respective embodiments.

The rod materials of the jig are put into the slot provided on the table. However, when, instead of the slot, a plurality of tap holes are formed on the table, the jig may be positioned by inserting or screwing the rod materials into the tap holes. By thus using the tap holes, even without the slot on the table, the calibration master can be installed in a predetermined direction and measured.

The number and positions of the holes, which include blind holes and tap holes, provided in the plate are not limited to the above respective embodiments and can be appropriately changed. The shape of the holes is not limited to a circular shape, and other shapes, such as quadrangle and polygonal shapes, can be employed. The shape of the rod materials can be appropriately changed according to the shape of the holes.

The structure of the calibration master itself is not limited to the above embodiments. Needless to say, the number of the target balls can be increased and decreased and the positions of the target balls can be changed, and a calibration master having a portion to be measured other than the target balls can be employed. Other than the touch probe, a displacement sensor and the like can be employed as a sensor.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A measuring method for a calibration master installing jig for installing a calibration master fixed on an other auxiliary jig in a predetermined direction on a table to measure the calibration master using a sensor mounted to a spindle head in a machine tool, wherein the machine tool includes two or more translational axes, the table provided with a plurality of slots or tap holes, and the spindle head configured to hold a tool, and the translational axes enable a relative motion of two degrees or more of translational freedom of the tool held onto the spindle head with respect to a workpiece installed on the table, and the calibration master includes a plurality of targets disposed thereon in a row;

wherein the calibration master installing jig comprising:

a plate in which three or more holes are provided; and a plurality of rod materials insertable into the holes, wherein by putting the plurality of rod materials individually inserted into any given three or more holes into one slot or any of the tap holes from a top surface of the table, a straight line connecting the plurality of rod materials becomes parallel to the predetermined direction on the table; and an angle formed by a first straight line connecting any two of the holes and a second straight line connecting two of the holes different from any one or both of the two holes is equal to an angle formed by a straight line in a direction in which the slots of the table extend and the predetermined direction, or an angle formed by a straight line connecting two of the tap holes and the predetermined direction; and the measuring method comprising:

positioning the calibration master installing jig on the table such that a straight line connecting the plurality of rod materials is in the predetermined direction;

installing the calibration master in the predetermined direction by bringing the calibration master into indirect contact with the plurality of rod materials via the other auxiliary jig; and measuring the calibration master using the sensor.

* * * * *